Aug. 13, 1946.   W. R. MOBLEY   2,405,705
PROCESS AND APPARATUS FOR RECLAIMING GREASE
Filed July 10, 1943

William R. Mobley,
INVENTOR.

Patented Aug. 13, 1946

2,405,705

UNITED STATES PATENT OFFICE 2,405,705

PROCESS AND APPARATUS FOR RECLAIMING GREASE

William Robert Mobley, Miami, Fla.

Application July 10, 1943, Serial No. 494,257

7 Claims. (Cl. 210—56)

My invention relates to a process and apparatus for reclaiming grease.

The process consists of forming a body or bodies of liquid (water) in a negative pressure zone and passing a stream of liquid or liquid mixture into the said body or bodies and separating, purifying and retaining the lighter liquids contained in the said stream, and discharging continuously, or at intervals, from the said body or bodies an amount of liquid substantially equal to the total amount of liquid or liquid mixture carried by the said stream.

The apparatus consists of a chamber or chambers provided with an intake opening for the said liquid or liquids and a discharge opening for the said separated heavy liquids and impurities, and a negative storage space for the reclaimed light liquids.

Where I employ two chambers they communicate with each other thru openings in each chamber, said openings being provided with connecting means whereby or whereat the said chambers are detachable and removable from each other.

In the case of a single chamber the said chamber is provided with a connecting means whereby or whereat it is detachable and removable from a base member. The said base member is provided with intake and discharge passages leading to and from the interior of the said chamber. The said intake and discharge passages are provided with liquid traps at their lower ends, all of which will be hereinafter disclosed and described in the accompanying drawing and following specifications.

While I have disclosed and described what now appears to be preferred forms of the invention it is to be understood that the drawing is for illustrative purposes only and that the parts and their relative size, location and relation to each other are subject to change and modification within the spirit and scope of my invention.

The primary object of the invention is to reclaim grease or grease and oil by separating them from water, moisture and other impurities.

Another primary object of the invention is to provide a detachable and removable negative-pressure storage chamber for the said grease and oil reclaimed.

A further object of the invention is to provide a negative pressure storage zone for the reclaimed grease and oil to prevent deterioration over a period of time necessary to accumulate a desired quantity.

Another object of the invention is to prevent the undesirable accumulation of grease in the plumbing and sewer lines.

Another object of the invention is to provide a unit which may be installed permanently in the plumbing between the kitchen sink and the sewer line.

Another primary object of the invention is to provide a portable unit to be used in household kitchens, hotels and restaurants.

Figure 1:
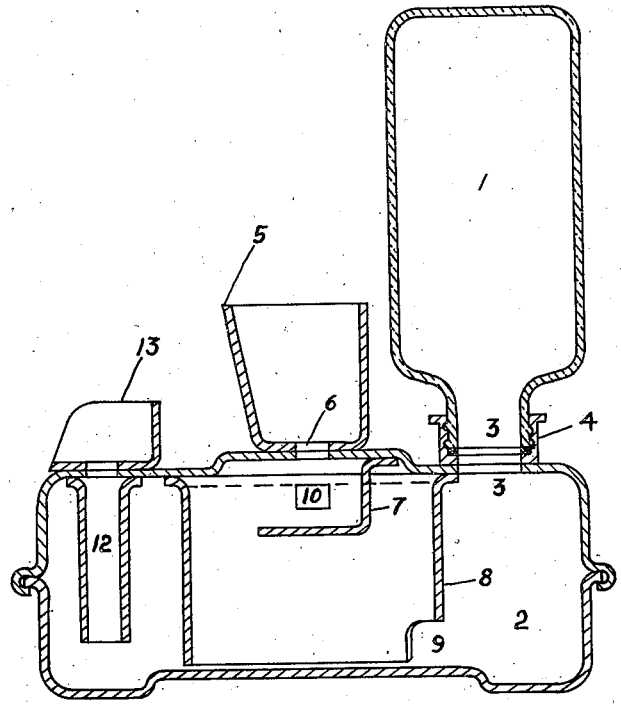
Fig. 1 is a cross section taken thru the center of the device showing complete structural details.

Referring to Fig. 1 of the drawing, it will be observed that I have disclosed an upper chamber 1 and a lower chamber 2. The said upper and lower chambers 1 and 2 communicate with each other thru the opening 3. The said openings 3 leading to and from the said chambers are provided with a connecting means shown at 4 whereby or whereat they are detachable and removable from each other. The said chamber 2 is provided with a funnel 5 communicating thru an opening 6. Suspended below the said opening 6 I have provided a spreader baffle 7. Surrounding the said baffle 7 I have provided a cylindrical baffle 8. The lower edge of the said baffle 8 terminates in close proximity with the bottom wall of the said chamber 2 and an opening 9 is formed at the lower portion of the said baffle 8. The top of the said baffle 8 is attached in air tight relation to the upper wall of the said chamber 2 and the upper portion is provided with an opening or openings one of which is shown at 10. The top portion of the said wall of the said chamber 2 is raised to form a trap shown at 11.

I have disclosed a passage 12 communicating with the lower interior of the said chamber 2 at one end, and a spillway 13 at the other end. The said spillway 13 is shown slightly above the said top walls of the said chamber 2 but it may be raised to a point where it would be level with the lower walls of the funnel 5.

I will now describe the invention in operation. The chamber 1 is detached from the chamber 2 and inverted, after which it is completely filled with water thru the opening 3. The chamber 2 is now completely filled with water thru the opening 6 and the funnel 5 until the water discharges from the spillway 13. Both of these operations may be accomplished by placing the chambers under the water tap. The chamber 1, with the finger over the opening 3, is inverted. The finger is then removed from the said opening and the chambers 1 and 2 are quickly connected together in air tight relation. It will be observed that the weight of the water held above its natural level would create and maintain a negative pressure zone in the said chamber 1. The device is now placed preferably on the drain board in a position so that the water from the spillway 13 will be discharged into the sink.

Grease or oil or grease and oil in combination with water are poured into the funnel 5 where they pass thru the opening 6 and thru the trap 11 and are spread by the baffle 7 in the chamber formed by the baffle 8. The light liquids and the air bubbles carried by the liquid stream entering thru the opening 6 rise to the top of the trap 11 and the air bubbles return thru the opening 6. The light liquids, grease or grease and oil, pass thru the opening 10 in the wall of the baffle 8 and travel under the top wall of the chamber 2 and pass thru the opening 3 into the top of the interior of the chamber 1, where it remains stored in a negative pressure.

The water displaced by the reclaimed liquids passes through the opening 3 into the chamber 2 and passes out thru the passage 12 with the separated water and impurities discharged from the opening 9 in the baffle 8.

When the chamber 1 is completely filled with reclaimed liquid it may be removed and emptied. It may again be refilled with water and again connected in air tight relation to chamber 2, and the device is again ready to use.

Figure 2:
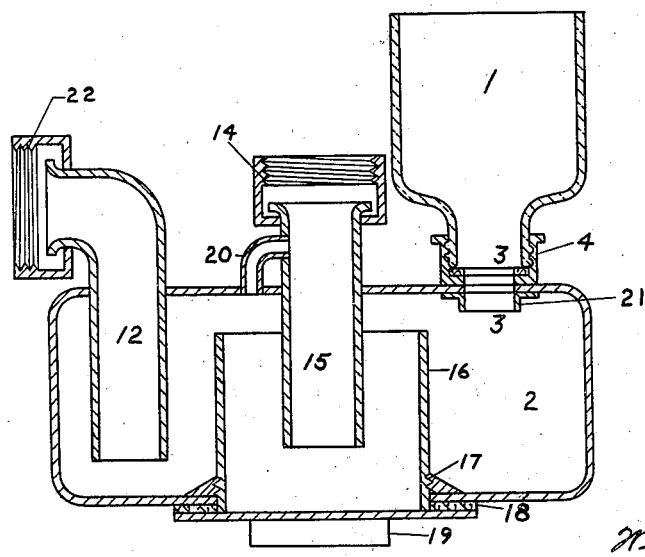
Fig. 2 is a cross section taken thru the center showing the complete structure of a modified form of the invention.

Referring to Fig. 2, it will be observed that I have disclosed an upper and lower chamber 1 and 2 communicating with each other thru an opening 3. The said chambers are detachable and removable by a connecting means shown at 4. The said chamber 1 is open at the top, but I may substitute the enclosed chamber shown in Fig. 1 for the open chamber shown in Fig. 2, or vice versa.

A passage 15 communicates with the sink at its upper end and with the interior of the chamber 2 at its lower end. A removable baffle 16 provided with threads 17 and a gasket 18 completely surrounds the lower end of the passage 15, and is provided with the hand grip 19. An air passage 20 communicates with the upper interior of chamber 1 and the interior of the passage 15. I have provided a trap 21 encircling the opening 3 into chamber 2. I have provided a discharge passage 12 communicating with the lower interior of the chamber 2, at its lower end, and provided with a connecting means 22 at the upper end whereby or whereat it may be connected to the sewer line (not shown).

The funnel 5 shown in Fig. 1 is replaced in Fig. 2 by the connecting means 14 to the sink (not shown). The spillway 13 shown in Fig. 1 is substituted for by the sewer connection 22 shown in Fig. 2.

The form of the invention shown in Fig. 2 operates as follows: The chamber 2 is first filled with water from the sink (not shown) thru the passage 15 and is discharged into the sewer line (not shown) thru the passage 12 and the connecting means 22 attached to the sewer line (not shown).

The water and the grease and oil which are continuously or at intervals passed into the chamber 2 thru the passage 15 from the sink (not shown) are separated and the light liquids are collected, purified by washing, and eventually accumulate where they overflow the trap 21 and pass into the chamber 1 thru the opening 3, where they may be removed by a spoon or other means.

The water is passed upward by the baffle 16 and flows downward entering the discharge passage 12 and passes into the sewer line (not shown). I may substitute the enclosed chamber 1 shown in Fig. 1 for the open chamber 1 shown in Fig. 2, and the said enclosed chamber 1 would be filled with water thru the opening 3 and inverted and connected to the opening 3 in chamber 2. In this case it would function the same as chamber 1 in Fig. 1, storing the grease in a negative pressure, and the said chamber 1 is removed, as has already been described, when filled.

The baffle 16 in Fig. 2 is adaptable to be removed for cleaning of the permanent installation.

The negative pressure storage chambers 1 are preferably constructed of a transparent or translucent material.

It is desirable to mention that all baffling, including that shown and described, may be eliminated since the baffling is employed for the purpose of reducing the size of the separating chambers and lowering the cost of manufacturing, and are not essential to the successful operation of the invention.

Having disclosed and described my invention in detail, I claim:

1. The method of reclaiming grease from heavier liquids which consists in filling a closed vessel to form a liquid body composed of a mixture of grease and a heavier liquid by passing the mixture into the vessel thru an inlet passage extending above the level of liquid in the vessel, separating entrained air from the liquid and venting said air from the upper portion of the vessel, discharging liquid from the vessel thru an overflow leading from the lower portion of the vessel, whereby the grease carried in the liquid is floated to the upper surface of said liquid body, forming a second body of like said heavier liquid in a closed retainer positioned above the liquid level in said vessel and having a common inlet and outlet passage communicating with the first mentioned body of liquid at a location removed from the flow path of said liquid passing from the inlet to said overflow and remote from the zone of said air separation, whereby the air is excluded from the second body of liquid and the grease floats from the first liquid body into the upper part of said second liquid body.

2. The method of reclaiming from a carrier liquid a lighter substance floating therein which consists in passing the liquid mixture into a closed vessel to maintain a predetermined level therein and discharging surplus liquid thru an overflow outlet leading upwardly from below the normal liquid level in said closed vessel, separating the entrained air and the said lighter substance from the mixture by flotation within the closed vessel, forming a body of said carrier liquid in a closed container positioned above the closed vessel and having a common inlet and outlet sealed by the liquid contained in the closed vessel at a location removed from the flow path of the carrier liquid thru the said vessel, venting the air from the first mentioned vessel and floating the lighter substance upwardly from the liquid contained in the closed vessel into the upper portion of said closed container.

3. A grease reclaimer consisting of closed upper and lower chambers to be filled with liquid and communicating with each other thru a common inlet and outlet passage leading into the top portion of the lower chamber, a funnel mounted on the top of the said lower chamber and communicating with the lower chamber, means defining an overflow passage communicating with the interior of the said lower chamber and the said funnel at a location remote from said common inlet and outlet passage whereby air separating from said liquid is excluded from said upper chamber, a baffle interposed below the said opening, a cylindrical baffle attached to the top wall of the said lower chamber, the lower end of the said cylindrical baffle terminating adjacent to the bottom wall of the said lower chamber, there being an opening thru the upper portion of the wall of the said cylindrical baffle, an opening at the bottom of the said cylindrical baffle, and means defining an overflow discharge passage leading from the lower portion of the said lower chamber to a spillway at a predetermined position relative to the top wall of the said lower chamber.

4. An apparatus for reclaiming grease from liquids of greater specific gravity, comprising a closed receiving vessel having an inlet passage leading into the upper portion thereof thru which a mixture of a liquid and grease is delivered into said vessel, means dividing the receiving vessel into inner and outer chambers, the inner chamber of which constitutes a separating chamber and communicates with said inlet passage, a baffle positioned in said inner chamber opposite the inlet passage so as to facilitate the separation of air and grease from the incoming liquid mixture, whereby the air vents to the atmosphere thru the inlet and the grease floats on the body of liquid contained in the inner chamber, there being a passage at the lower portion of the inner chamber for discharging liquid into the outer chamber, means defining an overflow outlet communicating with the lower portion of the outer chamber, means defining an outlet for grease leading from the upper portion of the inner chamber into the outer chamber, a closed storage vessel adapted to be filled with said liquid of greater specific gravity than grease and positioned above the receiving vessel and having a common inlet and outlet passage sealed by the liquid in the outer chamber of the receiving vessel, whereby the grease floated into said outer chamber is floated along the closed top thereof into said storage vessel.

5. An apparatus for reclaiming grease from carrier liquids of greater specific gravity, comprising a liquid receiving vessel having an opening in its upper portion for the entrance of liquid and for venting air entrained therewith, means defining an overflow discharge passage leading from the lower portion of the receiving vessel, baffle means positioned in the flow path of the liquid between said opening and the entrance end of said discharge passage to facilitate the separation of air and grease from the liquid, whereby the grease is caused to float to the top of the liquid in said receiving vessel, a closed removable storage vessel for containing a carrier liquid body and having a common inlet and discharge port at its lower end dipping into the liquid of the receiving vessel at a location remote from the flow path of liquid thru the receiving vessel and remote from the zone of air separation, and means overlying the separated grease in the receiving vessel for directing the grease into the inlet of said storage vessel.

6. An apparatus for reclaiming grease from carrier liquids of greater specific gravity, comprising a liquid receiving vessel having an opening in its upper portion for the entrance of liquid and for venting air entrained therewith, means defining an overflow discharge passage leading from the lower portion of the receiving vessel, baffle means positioned in the path of the liquid between said opening and the entrance end of said discharge passage to facilitate the separation of air and grease from the liquid, whereby the grease is caused to float to the top of the liquid in the receiving vessel, a removable storage vessel for containing a carrier liquid body and having a common inlet and discharge port at its lower end sealed by the liquid in the receiving vessel at a location remote from the flow path of liquid thru the receiving vessel and remote from the zone of air separation, and means defining a cover for the receiving vessel for directing the grease therein into the inlet of said storage vessel.

7. An apparatus for reclaiming grease from carrier liquids of greater specific gravity, comprising a liquid receiving vessel having an opening in its upper portion for the entrance of liquid and for venting air entrained therewith, means defining an overflow discharge passage leading from the lower portion of the receiving vessel, means dividing the receiving vessel into an inner separating chamber and an outer chamber, baffle means positioned in the inner separating chamber to facilitate the separation of grease and air from the carrier liquid, a closed removable storage vessel for containing a carrier liquid body and having a common inlet and discharge port at its lower end dipping into the liquid of the receiving vessel at a location remote from the flow path of liquid thru the receiving vessel and remote from the zone of air separation, and means defining a cover overlying the separated grease for directing said grease into the inlet of said storage vessel.

WILLIAM R. MOBLEY.